Dec. 15, 1959 J. H. McGUIGAN 2,917,625

TOGGLE CIRCUIT

Filed March 12, 1954

INVENTOR
J. H. McGUIGAN
BY James W. Falk
ATTORNEY

United States Patent Office 2,917,625

Patented Dec. 15, 1959

2,917,625

TOGGLE CIRCUIT

John H. McGuigan, New Providence, N.J., assignor to Bell Telephone Laboratories, Incorporated, New York, N.Y., a corporation of New York Application March 12, 1954, Serial No. 415,732

11 Claims. (Cl. 250—27)

Figure 1:
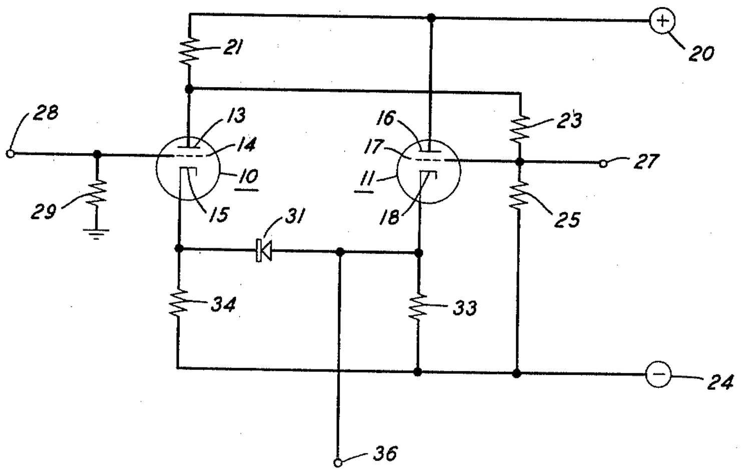

This invention relates to electrical circuits and more particularly to such circuits having two states of stability, such as flip-flop or toggle circuits.

One type of double stability circuit is that known as the Schmitt toggle circuit and involves a suitable choice of parameters in the original Schmitt trigger circuit, described in an article by O. H. Schmitt, "A Thermionic Trigger," in Journal of Scientific Instruments (1938) vol. 15, page 24 and also at page 81 of "Time Bases" by O. S. Puckle (John Wiley, 1951, 2nd Ed.). In this circuit there are two back coupled triodes having direct couplings between them. One of these couplings is a resistance coupling between the anode of the first tube and the grid of the second, while the other is the common cathode resistance.

Voltage signals indicating the state of the Schmitt toggle exist at the plates of the tubes, the grid which is resistance coupled to the anode of the other tube, and the common cathode. Generally, the output signal is taken from one or both of the plates of the tubes. However, if the toggle is to be employed in a large-scale logical device, such as a computer or a telephone switching control system, this is not advantageous. In such systems, it is desirable that the impedance level of the output signal be low and also that the voltage base line of the output signals be about midway between the voltage biases applied to the anode and cathode resistances of the toggle circuit. Low impedance is advantageous in such systems because the magnitude of the system may require the pulses to be transmitted over considerable distances. And a signal base line about midway between the two bias voltages of the toggle is advantageous so that these same bias voltages may be employed as the bias voltages for diode-gate logic circuits to which the toggle circuit is connected in the system.

The utilization of the same voltage supplies to provide the bias voltages for both the toggle circuits and diode logic circuits in a large computing or switching system reduces the number of supplies and concomitant equipment needed for the system. The desirability of having the base line and peak pulse voltages of the toggle outputs removed from these bias voltages is to assure fast operation of the diode logic gates. Due to stray capacitances associated with each diode in the gate, the response of the diode gate to pulses having step fronts is not ideal, so that the pulse at the output of the gate will have a front following an exponential due to the build up of voltage across the stray capacitances associated with the diodes. If the output of the diode gate is connected by a biasing resistor to a supply voltage which is only slightly larger than the extreme of the signal excursion, which is the maximum voltage of the toggle output pulse, then this buildup will be relatively slow and the output pulse of the diode gate will have a sloping front. However, by making the supply voltage considerably larger than the voltage of the pulse, the stray capacitances in trying to charge up to the supply voltage will rapidly charge up to the maximum pulse voltage and thus the response of the diode gate will be rapid.

Therefore if the base line voltage of the output signal is considerably smaller than the plate supply voltage of the toggle, this existing power supply in the system can provide the bias both for the toggles and the diode gates. However, if the signal base line is close to one of the toggle supply voltages, as is the case when the output signal is taken from the plate of a tube of the toggle, an additional power supply of higher voltage is required for the gate bias.

For this reason it is not desirable to take the output from the plate of either tube of the toggle. And as the voltage appearing on the grid of the tube to which input pulses are not applied is of a high impedance level, this voltage is not desirable for the output of the toggle. Further it is advantageous to be able to apply input pulses to either of the control grids of the toggle tubes.

The cathode signal is therefore preferable to either of the two discussed above as its impedance level is lower than the impedance level of either a grid or plate signal and also because of the position of the base line voltage of the cathode signal relative to the biases applied to the toggle tubes. Taking the output signal from the common cathode resistance of the prior art Schmitt type toggle circuit, however, raises another serious problem when it is desired to apply triggering pulses to the grid which is resistance coupled to the anode of the other tube; this is the problem of triggering sensitivity. Triggering sensitivity is the measure of the amplitude of the signals which change the state of the toggle.

In a Schmitt type toggle circuit we can say that, to a first approximation, the voltage required to trip the toggle to either state is that voltage which will raise the negative grid up to the common voltage level of the cathodes. In the Schmitt type toggle circuit, the control electrode of one tube is connected, through suitable resistances, to the cathode bias voltage supply and to the plate of the other tube. Let us consider the voltage that must be applied to this control electrode to shift conduction from the other tube to this tube when the output is taken from the cathodes. Because of the resistive coupling between this control electrode and the plate of the other tube, if current flows out of the output terminal, the control grid is driven more negative with respect to the cathode and it becomes more difficult to change the state of the circuit, i.e., to shift conduction to this tube. On the other hand if current flows into the output terminal, the control electrode becomes less negative with respect to the cathode and then it becomes easier to shift conduction to this tube. In fact, in the limit, the circuit loses control entirely and conduction remains in this tube at all times. It is to be remembered that the output load, which is assumed to consist of diode gates, may by its nature either draw current out of the output terminal of the circuit or else supply current which flows into the output terminal.

It is an object of this invention to provide an improved toggle circuit.

It is a further object of this invention to provide an improved toggle circuit of the Schmitt type which may be triggered by application of triggering pulses to a control electrode of either tube of the circuit, the triggering sensitivity of the circuit being independent of the output load.

It is a still further object of this invention to provide an improved toggle circuit wherein the triggering sensitivity does not vary with load current.

It is another object of this invention to provide a toggle circuit for use as a driver of diode gates in high-speed switching circuits that has a high reliability, low output impedance, insensitivity to loading, and a signal base line near ground potential.

These and various other objects of this invention are attained in one specific illustrative embodiment wherein a toggle circuit comprises a pair of electron discharge devices and, in accordance with an aspect of this invention, has a first stable state when only one of the devices is conducting and a second stable state when both the devices are conducting. Individual cathode resistances are connected to the cathodes of the two devices and a unidirectional current element, such as a diode, is connected between the cathodes and so poled to conduct only when the circuit is in the stable state wherein only one of the devices is conducting. An output terminal is connected to the cathode of the device which is conducting in both states of the circuit.

The conducting tube to whose cathode the output terminal is connected therefore acts as a cathode follower whose load impedance is either solely its cathode impedance or the parallel combination of the two cathode impedances. When only this tube is conducting the voltage on the output terminal is high whereas when both tubes are conducting the voltage at the output terminal is low. In either case, as the driving electron discharge device is always conducting, the flow of load current into the output terminal or out therefrom, depending on the type and condition of the output load, has no effect on the control of the circuit by triggering pulses applied to the control grid of either device.

It is a feature of this invention that a toggle circuit have the stable states defined when only one tube of the circuit is conducting and when both tubes are conducting, the output being taken from the cathode of the continuously conducting tube.

It is a further feature of this invention that individual cathode impedances be connected to the cathodes of two tubes of the circuit and a unidirectional current element be connected between the two cathodes and poled so as to allow passage of current therethrough only away from the cathode of the continuously conducting tube.

Figure 2:
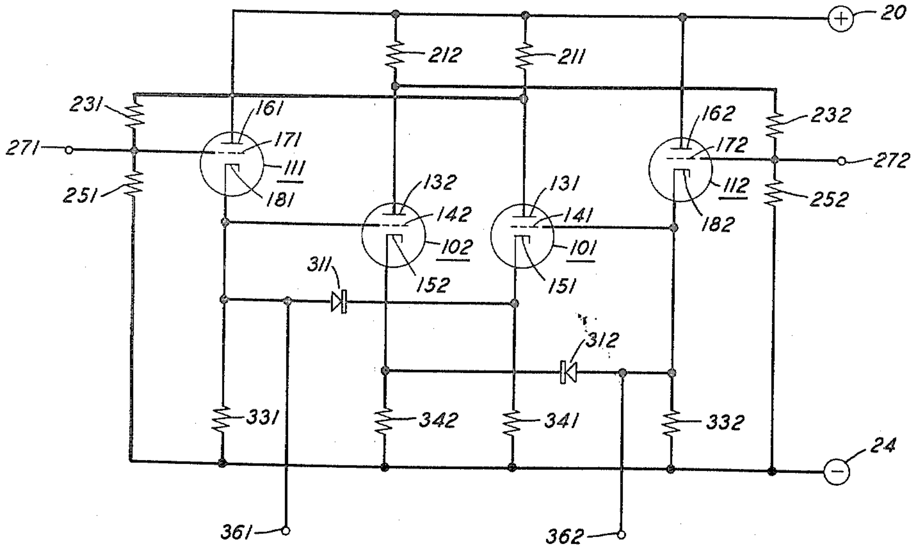

A complete understanding of this invention and of these and other features thereof may be gained from consideration of the following detailed description and the accompanying drawing in which:

Fig. 1 is a schematic representation of a circuit illustrative of one specific embodiment of this invention; and Fig. 2 is a schematic representation of a circuit illustrative of another specific embodiment of this invention.

Turning now to the drawing, the specific illustrative embodiment of this invention depicted in Fig. 1 comprises a pair of triodes 10 and 11, triode 10 comprising a plate or anode 13, a control grid 14, and a cathode 15 and triode 11 similarly comprising a plate or anode 16, a control grid 17, and a cathode 18. Anode 16 is directly connected to a positive anode bias voltage source 20 to which anode 13 is also connected through a plate resistance 21. Control grid 17 of triode 11 is connected to the plate 13 of triode 10 through a resistance 23 and to a negative cathode bias voltage supply 24 through a resistance 25. An input terminal 27 is connected to control grid 17 and an input terminal 28 is connected to control grid 14 across a resistance 29 connected to ground.

The circuit configuration thus far described is basically similar to that of the Schmitt type toggle circuit. However, in accordance with an aspect of this invention a diode or other unidirectional conducting element 31, such as a varistor, is connected between the cathodes 15 and 18 and so poled as to conduct only when cathode 18 is at the same or higher potential than cathode 15. Cathode 18 is connected to the cathode bias source 24 through a cathode resistance 33 and cathode 15 is similarly connected to source 24 through a cathode resistance 34. An output terminal 36 is connected to cathode 18.

The meritorious advantages of a toggle circuit in accordance with this invention can be readily understood from a consideration of the operation of the circuit. The two stable states of this circuit are when conduction is present in both triodes, which we shall define as the Off state, and when conduction is present only in triode 11, which we shall define as the On state.

Therefore in the Off state of this circuit, both tube 10 and tube 11 conduct; tube 11 acts as a cathode follower with a load resistance 33. The voltage on control grid 17 and the voltage at cathode 18 are both low; the varistor 31 is biased in its back direction. Accordingly, the output voltage appearing at the output terminal 36 is low and the triode 11 acts as a cathode follower with a load consisting of resistance 33. Up to the limit of linear operation of triode 11 the output voltage of the circuit is substantially independent of load current, the voltage of the control grid 27 also substantially independent of load current, and therefore the triggering sensitivity constant.

In the On state of this circuit triode 10 is cut off. The voltage on control grid 17 and the voltage on cathode 18 are both high; the varistor 31 is now biased in its forward direction and conducts. Accordingly triode 11 now acts as a cathode follower but with load resistances 33 and 34 in parallel. The output voltage appearing at the output terminal is high. The output voltage and the triggering sensitivity are again subtantially independent of load current.

It is thus to be noted that in a toggle circuit in accordance with this invention triggering from one state to the other may be attained by the application of appropriate positive and negative pulses to either control grid and that even though triggering is attained by application of triggering pulses to control grid 17, the load current will have no effect on the triggering sensitivity. Thus a toggle circuit in accordance with this invention can be employed with output circuits, such as diode logic gates, which either draw or supply current at the output terminal 36 over a wide variety of current values without affecting the size of pulses to be utilized for triggering or the control of the triggering pulses over the operation of the circuit.

Triode 10 may advantageously be operated at a relatively low current level, with a consequent saving in power, as it has no connection with the output circuit.

In one specific circuit in accordance with the embodiment of Fig. 1 the bias supply voltages 20 and 24 were +130 volts and −48 volts, respectively, the tubes 10 and 11 were the two halves of a Tung-Sol 5687 twin triode, diode 31 was a Western Electric 400–A varistor, and the various resistances had the following values:

| | | |
|---|---|---|
| Resistance **21** | ohms | 43,000 |
| Resistance **23** | megohms | 2.15 |
| Resistance **25** | do | 1.0 |
| Resistance **33** | ohms | 4,700 |
| Resistance **34** | do | 15,000 |

Input terminal 28 was biased at −15 volts. A triggering pulse was applied to terminal 27 to switch the circuit to its On state, and a pulse was applied to terminal 28 to switch the circuit to its Off state. The triggering pulses were of the order of 20 volts to attain a voltage level on the control grids several volts above ground.

When the circuit is in its On state only tube 11 conducts and its current is high. Accordingly, its cathode voltage is high, diode 31 conducts, and tube 10 is cut off. In the specific circuit whose parameters are given above, the voltage at output terminal 36 for the On state was zero volts. When the circuit is in its Off state both tubes are conducting, the current through tube 11 is low, and accordingly its cathode 18 is at a low voltage. Diode 31 does not conduct in this state but tube 10 does. In this specific embodiment the voltage at output terminal 36 was −15 volts for the Off state.

This particular circuit is able to drive six stages of diode gates, as the output is taken from a very low impedance point. Resistance 33 should be as low as possible when working into an And gate in order to receive the necessary current without making the circuit unstable. This resistance, however, can be considerably larger when the toggle supplies Or gates.

In the embodiment of this invention described above and depicted in Fig. 1, one cell of memory is provided with direct or inverted output. In certain cases both positive and negative outputs are desired. This can be attained by the embodiment of the invention depicted in Fig. 2 wherein two of the circuits of Fig. 1 are connected back-to-back by directly connecting the cathodes 18 of the one circuit to the grids 14 of the other circuit; thus, as seen in the drawing, cathode 181 is connected directly to control grid 142 and cathode 182 to control grid 141. In accordance with an aspect of this invention, as described above, cathodes 181 and 151 have distinct cathode resistances 331 and 341 and are connected through a diode 311 and cathodes 182 and 152 similarly have distinct cathodes resistances 332 and 342 and are connected through a diode 312. One output 361 is taken from cathode 181 and the other output from cathode 182. The input or triggering pulses are applied to the input terminals 271 and 272 connected to the control electrodes 171 and 172 of the continuously conducting tubes 111 and 112.

While specific embodiments of this invention have been described above, it is to be understood that they are merely illustrative of the application of the principles of the invention. Numerous other arrangements may be devised by those skilled in the art without departing from the spirit and scope of the invention.

What is claimed is:

1. A bistable circuit comprising a pair of electron discharge devices each having a cathode, grid, and anode, a resistance directly connecting the anode of one device to the grid of the other device, a source of bias potential, means connecting said bias potential to the grid of said other device, said bias potential and said connecting means proportioned so that said other device continually conducts, means including individual resistances connected to said cathodes for biasing said cathodes, unidirectional current means connected directly between said cathodes to allow passage of current only from said other device cathode to said one device cathode, and an output terminal connected to said other device cathode.

2. A toggle circuit comprising a first electron discharge device comprising a cathode, grid, and anode, a second electron discharge device comprising a cathode, grid, and anode, a resistance directly coupling said first device anode to said second device grid, means including an impedance connected to each of said cathodes for biasing said cathodes, means coupling said second device grid to said cathode biasing means, unidirectional current means connected directly between said cathodes to allow passage of current only from said second device cathode to said first device cathode, a source of potential connected directly to the anode of said second device, a resistance connecting said source of potential to said anode of said first device, an output terminal connected to said second device cathode, and an input terminal connected to one of said grids for receiving triggering pulses to shift the state of said circuit.

3. A toggle circuit comprising a first and a second electron discharge device and having a first state when said second device only is conducting and a second state when both said devices are conducting, each of said devices comprising a cathode, a control grid, and an anode, a resistance directly coupling said first device anode to said second device grid, a cathode impedance connected individually to each of said cathodes, unidirectional current means connected directly between said cathodes and poled to prevent passage of current therethrough when said first device cathode is at a higher potential than said second device cathode, and an output terminal connected to said second device cathode.

4. A toggle circuit comprising a first and a second electron discharge device and having a first stable state when said second device only is conducting and a second stable state when both said devices are conducting, each of said devices comprising a cathode, a control grid, and an anode, a resistance directly connecting said first device anode to said second device grid, means biasing said anodes so that said second device is conducting, individual cathode resistances connected to each of said cathodes, unidirectional current means connected directly between said cathodes and poled to prevent passage of current when said first device cathode is at a higher potential than said second device cathode, an output terminal connected to said second device cathode, and an input terminal connected to one of said grids for receiving triggering pulses to shift the state of said circuit.

5. A toggle circuit comprising two sets of first and second electron discharge devices, each set having a first stable state when only said second device is conducting and a second stable state when both said devices are conducting, each of said devices comprising a cathode, a control grid, and an anode, means coupling said first device anodes to said second device grids, a cathode impedance connected individually to each of said cathodes, unidirectional current means between said first and second device cathodes and poled to prevent passage of current therethrough when said first device cathodes are at a higher potential than said second device cathodes, output terminals connected to each of said second device cathodes, and means coupling said second device cathodes to said first device control grids.

6. A toggle circuit comprising two sets of first and second electron discharge devices, each device comprising a cathode, a control grid, and an anode, resistive means coupling said first device anodes to said second device grids, means including an impedance connected individually to each of said cathodes for biasing said cathodes, means coupling said second device grids to said cathode biasing means, unidirectional current means connected between said first and second device cathodes to allow passage of current only from said second device cathodes to said first device cathodes, means biasing said anodes so that said second devices conduct, output terminals connected to each of said second device cathodes, an input terminal connected to one of said first device grids for receiving triggering pulses to shift the state of said circuit, and means coupling said second device cathodes to said first device grids.

7. A bistable circuit comprising a first and a second electron discharge device and having a first state when said second device only is conducting and a second state when both said devices are conducting, each of said devices comprising a cathode, a control grid, and an anode, bias source means, circuit means connecting said devices to said bias source means for causing continuous conduction of said second device, said circuit means including a resistance directly connecting the anode of said first device to the grid of said second device, means including individual resistances connected to said cathodes for biasing said cathodes, unidirectional current means connected directly between said cathodes to allow passage of current only from said second device cathode to said first device cathode, and an output terminal connected to said second device cathode.

8. A bistable circuit in accordance with claim 7 wherein said bias source means includes positive and negative source means, said circuit means further comprising a first impedance connected between said positive source means and said first device anode and a second impedance connected between said second device grid and said source means.

9. A bistable circuit in accordance with claim 8 wherein said second device anode is directly connected to said positive bias source means.

10. A bistable circuit in accordance with claim 9 wherein said first and second impedances are each resistances.

11. A bistable circuit in accordance with claim 7 further comprising an input terminal connected to one of said grids for receiving triggering pulses to shift the state of said circuit.

References Cited in the file of this patent

UNITED STATES PATENTS

| | | |
|---|---|---|
| 2,540,539 | Moore | Feb. 6, 1951 |
| 2,557,770 | Scoles | June 19, 1951 |
| 2,564,824 | White | Aug. 21, 1951 |
| 2,636,985 | Weissman | Apr. 28, 1953 |
| 2,683,806 | Moody | July 13, 1954 |